United States Patent [19]

Okamoto et al.

[11] Patent Number: 5,899,275

[45] Date of Patent: May 4, 1999

[54] INERT GAS FIRE FIGHTING SYSTEM AND PRESSURE CONTROL VALVE FOR INERT GAS FIRE FIGHTING SYSTEM

[75] Inventors: Akito Okamoto; Kyojyun Taiencho, both of Itami, Japan

[73] Assignee: Koatsu Co., Ltd., Hyogo, Japan

[21] Appl. No.: 08/867,847

[22] Filed: Jun. 3, 1997

Related U.S. Application Data

[62] Division of application No. 08/637,263, Apr. 25, 1996.

[30] Foreign Application Priority Data

May 12, 1995 [JP] Japan ................................. 7-138631

[51] Int. Cl.$^6$ ..................................................... A62C 37/46

[52] U.S. Cl. ............................................. 169/20; 169/11

[58] Field of Search ................................. 169/11, 19, 20, 169/21, 22; 137/79; 251/63.5, 63.6

[56] References Cited

U.S. PATENT DOCUMENTS 3,568,774  3/1971  Meoule ........................... 169/20 X

*Primary Examiner*—Andrew C. Pike
*Attorney, Agent, or Firm*—Wenderoth, Lind & Ponack, L.L.P.

[57] ABSTRACT

An inert gas fire fighting system is designed to extinguish fire by discharging inert gas fire extinguisher stored in a gaseous state in a fire extinguisher storage vessel into an object fire fighting section while maintaining the concentration of the inert gas fire extinguisher in the object fire fighting section at no less than the fire extinguishing concentration. A vessel valve of the fire extinguisher storage vessel is a pressure control valve which controls the gas pressure P of the inert gas fire extinguisher on the discharge side to no more than the reference gas pressure P0 determined by a gas pressure P1 of a constant-pressure gas source. This makes it possible to increase the charging pressure of the inert gas fire extinguisher without increasing the pressure resistance grade of the secondary side equipment units of the fire fighting system.

9 Claims, 7 Drawing Sheets

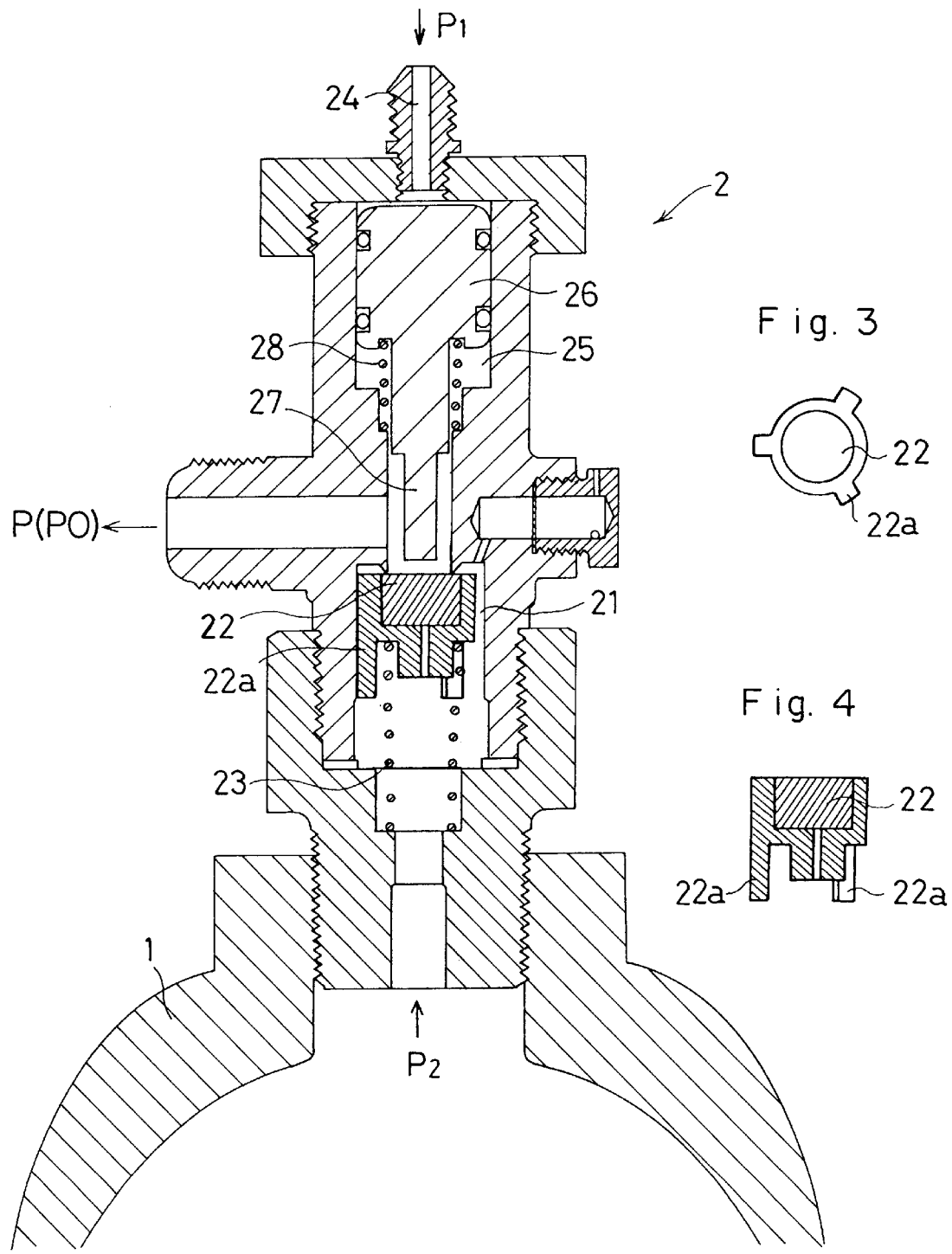

5,899,275

INERT GAS FIRE FIGHTING SYSTEM AND PRESSURE CONTROL VALVE FOR INERT GAS FIRE FIGHTING SYSTEM

This is a divisional application of Ser. No. 08/637,263, filed Apr. 25, 1996.

BACKGROUND OF THE INVENTION

The present invention relates to a gas fire fighting system for extinguishing fire by discharging inert gas fire extinguisher stored in a gaseous state in fire extinguisher storage vessels into the object fire fighting section, and maintaining the concentration of the fire extinguisher in the object fire fighting section at no less than a fire extinguishing concentration.

Conventionally, equipment using inert gas such as carbon dioxide, halogenated gas, etc. as fire extinguisher has been put in to practical use as a gas fire fighting system for extinguishing fire by discharging the gas fire extinguisher into an object fire fighting section and maintaining the concentration of the fire extinguisher in the object fire fighting section at no less than a fire extinguishing concentration.

When inert gas such as carbon dioxide, halogenated gas, etc. are used as fire extinguishers, the fire fighting system is designed in such a way as to liquefy the fire extinguishers under pressure and store them in fire extinguishing equipment in a charged state in a fire extinguisher storage vessel composed of a high-pressure gas vessel. In case of a fire, the carbon dioxide or halogenated gas is sent from the fire extinguisher storage vessel to an injection head through piping by opening a vessel valve of the fire extinguisher storage vessel by using an appropriate electrical means or pneumatic means and discharging it from the injection head into the object fire fighting section. At that time, the inert gas, such as carbon dioxide, halogenated gas, etc. is sent in a liquid state up to the injection head and, the moment when it is discharged from the injection head into the object fire fighting section, it is vaporized and gets into a gaseous state so as to fill the object fire fighting section and extinguish the fire.

The gas fire fighting system using inert gas such as carbon dioxide, halogenated gas, etc. is widely used not only in oil facilities and with electric equipment, but also in other general facilities, because of advantages such that it can rapidly extinguish fire, hardly stains the inside of the object fire fighting section with the fire extinguisher, does not spoil electric insulation, demonstrates powerful fire extinguishing effects even against an object of fire fighting of complicated structure, as the fire extinguisher penetrates through gaps, maintains a certain level of fire extinguishing capacity over a long period of time with no change of fire extinguisher, etc.

However, in recent years, problems regarding ozone layer depletion have arisen on a worldwide scale, and the production of fire extinguishers containing halogenated hydrocarbon components, such as halogenated gas, etc., was discontinued in January, 1994, making such fire extinguishers practically unusable. As a result, carbon dioxide has become the only fire extinguisher currently in use for gas fire fighting systems, except for special fire fighting systems using expensive rare gases such as argon, etc.

On the other hand, this fire fighting system using carbon dioxide is also known to have the following problems:

(1) The design concentration of carbon dioxide in the object fire fighting section at the time of fire fighting is approximately 35%. At this concentration, there is a possibility of producing a serious state claiming human life due to the toxicity (anesthetization) of carbon dioxide in case there is someone in the object fire fighting section.

(2) In case of a fire, the carbon dioxide is sent to the injection head in a liquid state and turns into a gas by evaporation the moment when it is discharged into the object fire fighting section. At that time, carbon dioxide absorbs heat of evaporation from the surrounding air, making the saturated vapor pressure of the room air drop, causing dew condensation of water content in the air and producing static electricity. As a result, the room air becomes hazy and presents a risk of serious secondary disasters by not only creating obstacles to evacuation and relief of people and fire fighting, but also causing defective insulation or trouble with electric equipment due to dew condensation or static electricity.

(3) Because carbon dioxide has a density much higher than that of air, the carbon dioxide discharged into the object fire fighting section is liable to not only stagnate in the lower part in the object fire fighting section and deteriorate in its fire extinguishing effects, but also disperse to the outside through openings at the bottom of the object fire fighting section.

(4) In view of the fact that problems of the greenhouse effect on the earth are being discussed on a worldwide scale, there is a possibility that the use of carbon dioxide may also be restricted in the future, in the same way as halogenated gas.

By the way, the assignee of the present invention previously proposed a fire fighting system using as fire extinguisher nitrogen gas or a mixed gas (hereinafter simply referred to as "mixed gas") prepared by mixing at least one kind of perfluoroalkane (perfluorobutane ($C_4F_{10}$)), hydrogenofluoroalkane (trifluoromethane ($CHF_3$), heptafluoropropane ($C_3HF_7$), pentafluoroethane ($C_2HF_5$), or hydrogenefluorohalogenoalkane (iodotrifluoromethane ($CF_3I$) (hereinafter generically referred to as "fluoric compounds") in nitrogen gas at a proportion no higher than 10 vol. %, to solve a lot of problems inherent in the gas fire fighting systems (Japanese Patent Application Publication Nos. 08-141102 and 08-243186).

However, it has been found that the following problems exist even in the case where nitrogen gas or mixed gas are used as fire extinguisher of gas fire fighting systems:

(1) Nitrogen gas or mixed gas used as fire extinguisher of gas fire fighting systems are stored in a state of pressurized gas, and therefore require a number of fire extinguisher vessels necessary for fire extinction of an object fire fighting section of a volume several times larger as carbon dioxide or halogenated gas, which are in a liquefied state due to pressurization, and thus require a large installation space for the fire extinguisher vessels.

(2) To reduce the number of fire extinguisher vessels to be installed, it is necessary to increase the charging pressure of the inert gas fire extinguisher to be charged in the fire extinguisher vessels. However, if the charging pressure of the inert gas fire extinguisher is increased, the high gas pressure of the inert gas fire extinguisher comes to be applied also to the secondary side equipment of the fire fighting system, such as a selecting valve, main piping, a branch pipe, an injection head, etc. This makes it necessary to increase the pressure resistance grade of those secondary side equipment units, thus leading to a sharp increase in equipment costs, and also making the application to existing facilities impossible.

SUMMARY OF THE INVENTION

The object of the present invention is to provide an inert gas fire fighting system and a pressure control valve for an inert gas fire fighting system capable of increasing the charging pressure of inert gas fire extinguishers without increasing the pressure resistance grade of the secondary side equipment units of the fire fighting system, by solving problems inherent in gas fire fighting systems using an inert gas fire extinguisher stored in a gaseous state, such as nitrogen gas, a mixed gas, etc., in fire extinguisher storage vessels.

To achieve the object, the inert gas fire fighting system of this invention is first realized as an inert gas fire fighting system for extinguishing fire by discharging an inert gas fire extinguisher stored in a gaseous state in fire extinguisher storage vessels in an object fire fighting section, and maintaining the concentration of the inert gas fire extinguisher in the object fire fighting section at no less than the fire extinguishing concentration needed. A vessel valve of the fire extinguisher storage vessels is a pressure control valve for controlling the gas pressure of the inert gas fire extinguisher at the discharge side to no more than the reference gas pressure determined by the gas pressure of a constant-pressure gas source.

The inert gas fire fighting system of this invention is secondly realized as an inert gas fire fighting system designed to extinguish fire by discharging an inert gas fire extinguisher stored in a gaseous state in a fire extinguisher storage vessel in the object fire fighting section, and maintaining the concentration of the inert gas fire extinguisher in the object fire fighting section at no less than the fire extinguishing concentration needed. A collecting pipe connects the fire extinguisher storage vessels with the selecting valve and has a pressure control valve for controlling the gas pressure of the inert gas fire extinguisher at the discharge side to no more than the reference gas pressure determined by the gas pressure of a constant-pressure gas source.

In this case, it is possible to change the reference base pressure by adding the gas pressure of the constant-pressure gas source, with the use of a pressure regulator, etc., for example.

Moreover, at 35° C., it is possible to use fire extinguisher storage vessels filled with an inert gas fire extinguisher at 180 kgf/cm$^2$ or more.

Furthermore, nitrogen gas can be used as an inert gas fire extinguisher.

The pressure control valve for the inert gas fire fighting system of the invention is composed of a flow channel valve provided in a flow channel of an inert gas fire extinguisher. A spring urges the flow channel valve in the direction closing the flow channel of the inert gas fire extinguisher. A gas feed port of a constant-pressure gas source is provided, and a piston is provided in a cylinder which is connected at one end to the gas feed port and at the other end to the discharge side of the flow channel of the inert gas fire extinguisher. An operating bar is formed at the end of the piston for operating the flow channel valve in the direction opening the flow channel of the inert gas fire extinguisher.

According to the present invention, it is possible to control the gas pressure of the inert gas fire extinguisher at the discharge side of the pressure control valve to no more than the reference gas pressure determined by the gas pressure of a constant-pressure gas source at no less than the fire extinguishing concentration needed, by either using a pressure control valve as the vessel valve of the fire extinguisher storage vessels, or by using a disposing pressure control valve as the collecting pipe connecting the fire extinguisher storage vessels with the selecting valve. Thus the application of high gas pressure of the inert gas fire extinguisher to the secondary side equipment of the fire fighting system is avoided.

This makes it possible to increase the charging pressure of the inert gas fire extinguisher without increasing the pressure resistance grade of the secondary side equipment units of the fire fighting system, to reduce the required installation space of the fire extinguisher storage vessels, and to reduce the equipment costs, thanks to the absence of any need of raising the pressure resistance grade of the secondary side equipment units of the fire fighting system. It also makes it possible to apply inert gas fire extinguishers stored in a gaseous state in the fire extinguisher storage vessels to existing facilities, because there is no need to raise the pressure resistance grade of the secondary side equipment units of the fire fighting system.

Moreover, this pressure control valve, which has the function of maintaining the gas pressure of the inert gas fire extinguisher at the discharge side of the pressure control valve at the reference gas pressure until the pressure of the fire extinguisher in the fire extinguisher storage vessels drops to no higher than the reference gas pressure, can maintain a constant discharge volume of the inert gas fire extinguisher, even in cases where the pressure of the inert gas fire extinguisher in the fire extinguisher storage vessels has dropped because of the discharge of the inert gas fire extinguisher. Therefore it is possible to effectively utilize the capacity of the fire fighting system and thus reduce equipment costs.

BRIEF DESCRIPTION OF THE DRAWINGS

FIG. 2 is a drawing showing a first embodiment of a pressure control valve for the inert gas fire fighting system of the present invention.

FIG. 3 is a plan view of a flow channel valve.

FIG. 4 is a vertical sectional view of the flow channel valve.

DETAILED DESCRIPTION OF THE INVENTION

The present invention will be explained hereafter based on illustrated embodiments.

Figure 1:
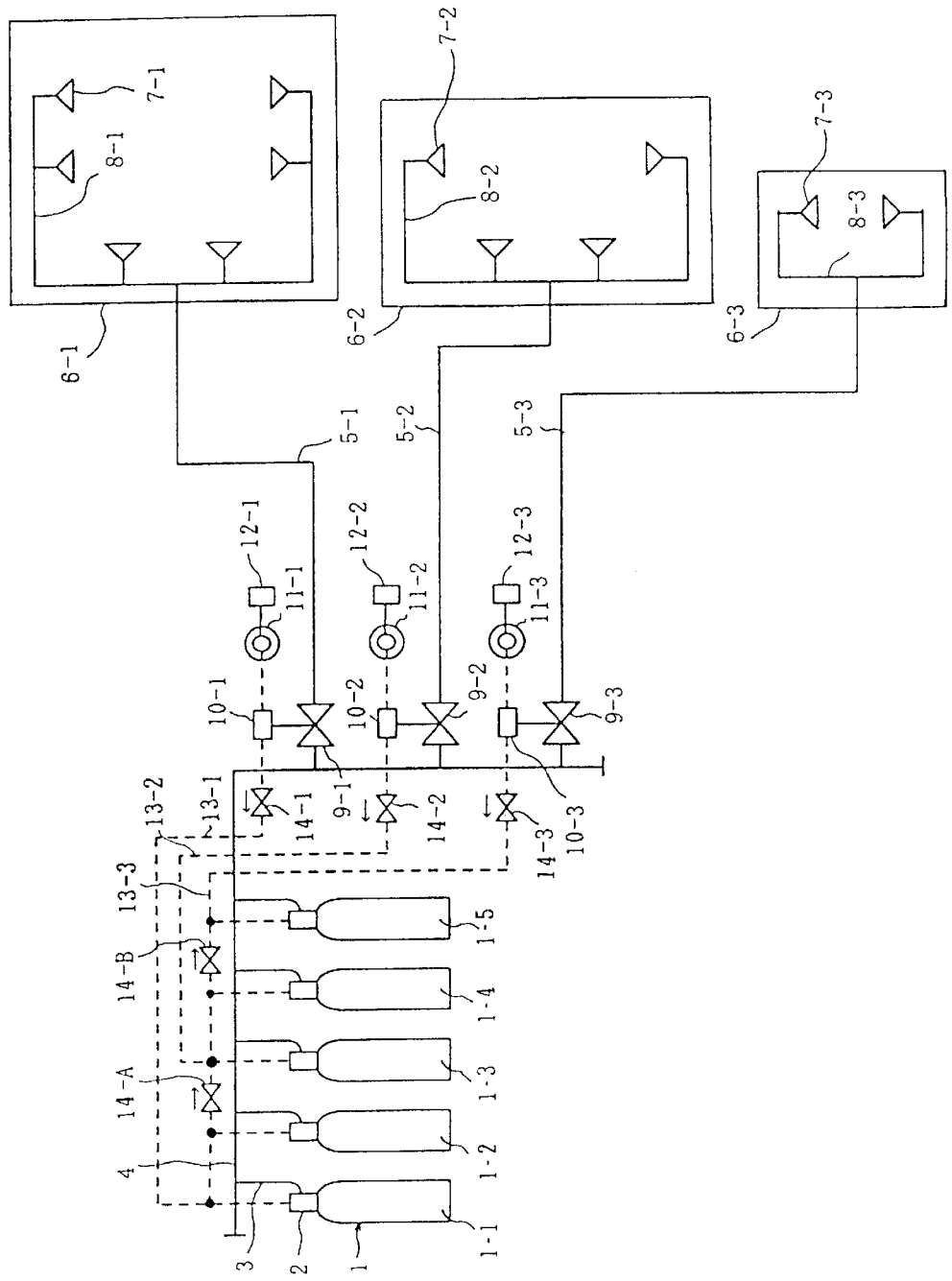
FIG. 1 is a drawing showing a first embodiment of an inert gas fire fighting system of the present invention.

FIG. 1 shows a first embodiment of the inert gas fire fighting system of the present invention.

This embodiment represents an inert gas fire fighting system having 3 object fire fighting sections 6-1, 6-2, 6-3.

The inert gas fire fighting system uses fire extinguisher storage vessels 1, storing an inert gas fire extinguisher, nitrogen gas for example, in the fire fighting system in a pressurized state and charged in high pressure gas vessels (180 kgf/cm$^2$ at 35° C.).

The inert gas fire fighting system of this embodiment is provided with five extinguisher storage vessels 1-1, 1-2, 1-3, 1-4, 1-5. To each vessel 1 is connected a connecting pipe 3 through a vessel valve 2. Connecting pipes 3 are further connected to a collecting pipe 4, which is then connected to main pipings 5-1, 5-2, 5-3 that extend up to the respective object fire fighting sections 6-1, 6-2, 6-3.

The main pipings 5-1, 5-2, 5-3 are provided with selecting valves 9-1, 9-2, 9-3 so as to selectively feed inert gas fire extinguisher to the object fire fighting sections 6-1, 6-2, 6-3.

The main pipings 5-1, 5-2, 5-3 are connected to branch pipes 8-1, 8-2, 8-3 provided respectively in the object fire fighting sections 6-1, 6-2, 6-3. Branch pipes 8-1, 8-2, 8-3 are connected to a plural number of injection heads 7-1, 7-2, 7-3 disposed at appropriate places in the object fire fighting sections 6-1, 6-2, 6-3.

By the way, since the respective object fire fighting sections 6-1, 6-2, 6-3 are usually different in volume from one another, the volume of the inert gas fire extinguisher required for fire fighting naturally varies from section to section. For that reason, in addition to changing the bore size of the main pipings 5-1, 5-2, 5-3 depending on the volume of the respective object fire fighting sections 6-1, 6-2, 6-3, the inert gas fire fighting system is constructed in such a way that, in case of a fire, a number of fire extinguisher storage vessels 1 corresponding to the object fire fighting sections 6-1, 6-2, 6-3 forming the subject of fire fighting are opened. Here, the number of fire extinguisher storage vessels 1 to be opened is set as five for object fire fighting section 6-1, these for object fire fighting section 6-2, and one for object fire fighting section 6-3.

In the drawing, 9-1, 9-2, 9-3 are selecting valves, 10-1, 10-2, 10-3 are selective valve opening devices, 11-1, 11-2, 11-3 are starting gas vessels, and 12-1, 12-2, 12-3 represent solenoids for releasing the starting gas vessels.

Moreover, in the drawing, 13-1, 13-2, 13-3 are starting gas pipelines for controlling the releasing of selecting valves 9-1, 9-2, 9-3. Starting gas vessels 11-1, 11-2, 11-3 are connected to the selecting valve opening devices 10-1, 10-2, 10-3 by disposing nonreturn valves 14-1, 14-2, 14-3, 14-A, 14-B at proper points on their way. The passable direction of the nonreturn valves 14-1, 14-2, 14-3, 14-A, 14-B is indicated with the direction of arrow marks in the drawing.

The numbers 1, 2, 3 at the end of the members correspond to the suffixes 1, 2, 3 of the object fire fighting sections, respectively.

The vessel valve 2 is a pressure control valve which controls the gas pressure P of the inert gas fire extinguisher on the discharge side of the vessel valve 2 to no more than a reference gas pressure P0 determined by the gas pressure P1 of a constant-pressure gas source, as indicated in FIGS. 2–4.

This pressure control valve is composed of a flow channel valve 22 having three guide members 22a provided in a flow channel 21, a spring 23 for urging the flow channel valve 22 in the direction closing the flow channel 21, and a gas feed port 24 from a constant-pressure gas source (in this embodiment, starting gas vessels 11-1, 11-2, 11-3 filled {110 kgf/cm² at 35° C.} with nitrogen are used as the constant-pressure gas source). A piston 26 is provided in a cylinder 25 which is connected at one end to the gas feed port 24 and at the other end to the discharge side of the flow channel 21 for the inert gas fire extinguisher. An operating bar 27 is formed at the end of the piston 26 for operating the flow channel valve 22 in the direction of opening the flow channel 21, and a spring 28 urges the piston 26 in the direction opposite to that of the flow channel valve 22.

Next, the motions of this pressure control valve will be explained.

When gas of a gas pressure P1 (110 kgf/cm²) is fed from the starting gas vessels 11-1, 11-2, 11-3 as the constant-pressure gas source to the gas feed port 24, it makes the piston 26 move against the urging force of the spring 28 to operate the flow channel valve 22 against the urging force of the spring 23 by means of the operating bar 27 formed at the end of the piston 26, and open the flow channel 21 for the inert gas fire extinguisher.

If the flow channel 21 is opened, inert gas fire extinguisher flows into the flow channel 21 from the fire extinguisher storage vessel 1, and the gas pressure P2 (180 kgf/cm² at 35° C.) of the inert gas fire extinguisher in the fire extinguisher storage vessel 1 acts on the other end side of the piston 26. The piston 26 then moves in the direction releasing the operation of the flow channel valve 22 by operating bar 27, making the flow channel valve 22 also move in the direction closing the flow channel 21 of inert gas fire extinguisher under the urging force of the spring 23.

However, because the gas pressure P1 (110 kgf/cm²) of the starting gas vessels 11-1, 11-2, 11-3 is acting on one end side of the piston 26, the flow channel valve 22 does not completely close the flow channel 21. The flow channel valve 22, the piston 26, and the operating bar 27 are balanced in an instant and, in the case of this embodiment, the gas pressure P of the inert gas fire extinguisher on the discharge side of the flow channel 21 is maintained at the same value as the gas pressure P1 (110 kgf/cm²) of the starting gas vessels 11-1, 11-2, 11-3.

In this case, the gas pressure P of the inert gas fire extinguisher on the discharge side maintained by the pressure control valve, i.e., the reference gas pressure P0, can be changed by either adjusting the gas pressure itself of the constant-pressure gas source, i.e., the starting gas vessels 11-1, 11-2, 11-3, by providing a pressure regulator on the starting gas vessels 11-1, 11-2, 11-3 and adjusting the gas pressure P1 by means of this pressure regulator, by using springs of different spring constants for the springs 23, 28, or having a different top diameter to bottom diameter ratio of the piston 26, etc. It is desirable to construct the system in a way to make the reference gas pressure P0 agree with the gas pressure P1 of the constant-pressure gas source from the viewpoint of the design of the inert gas fire fighting system.

This pressure control valve has a function of not only stopping the gas feed from the constant-pressure gas source to feed port 24, but also closing the flow channel 21 of the inert gas fire extinguisher by evacuating the gas insist the cylinder 25 over the piston 26. It is also possible, by utilizing this function, to construct the system in a way to close the once-opened fire extinguisher storage vessel.

Figure 5:
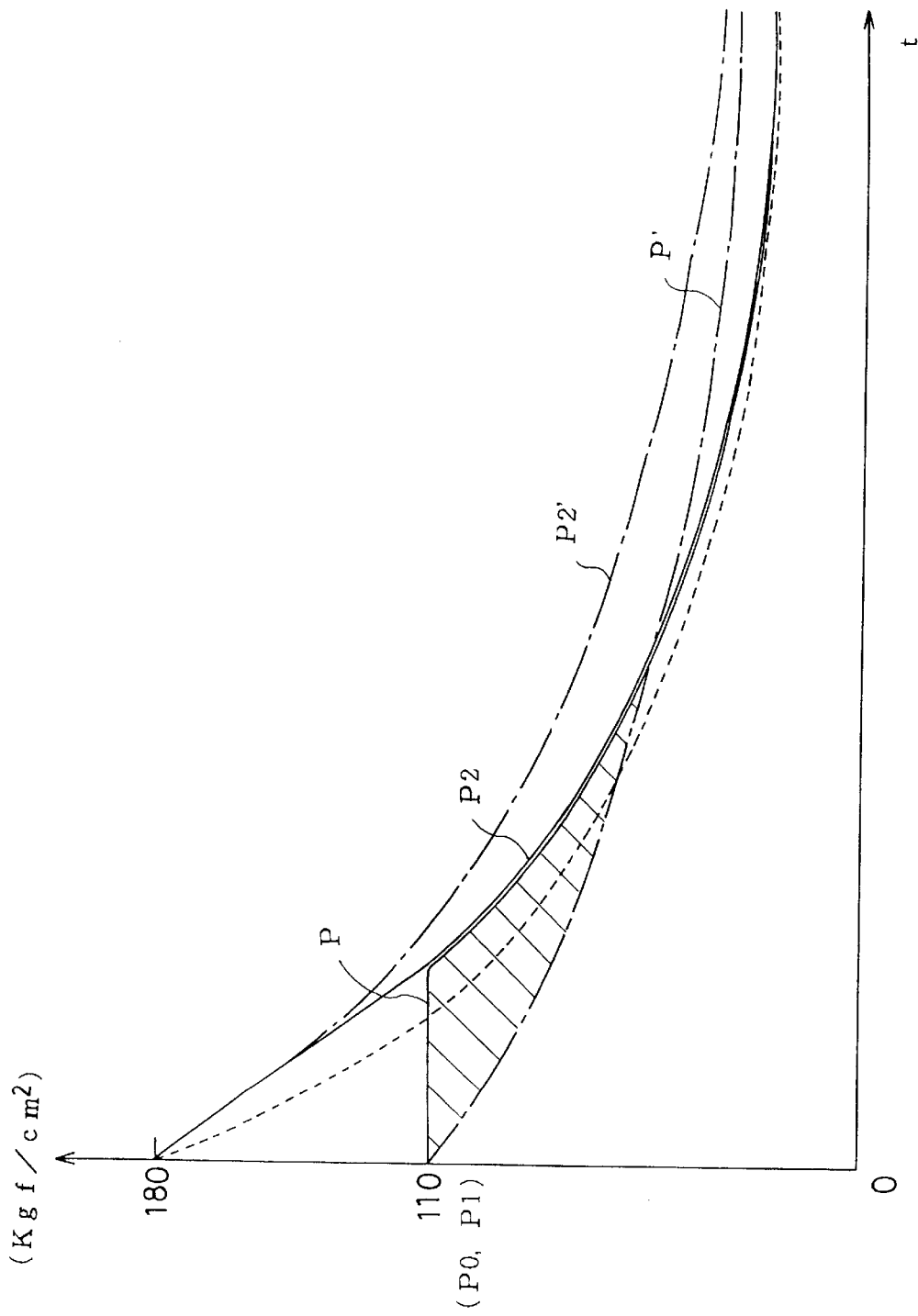
FIG. 5 is an explanatory drawing of the actions of the pressure control valve for the inert gas fire fighting system.

Because this pressure control valve has, as shown in FIG. 5, a function of maintaining the gas pressure P of the inert gas fire extinguisher on the discharge side of the pressure control valve at the reference gas pressure P0 until the pressure of the fire extinguisher in the fire extinguisher storage vessels 1 drops to no higher than the reference gas pressure P0, it can maintain the discharge volume of the inert gas fire extinguisher constant by maintaining the gas pressure P of the insert gas fire extinguisher on the discharge side of the pressure control valve at the reference gas pressure P0 even in the case where the pressure P2 of the inert gas fire extinguisher in the fire extinguisher storage vessels 1 has dropped.

FIG. 5 shows, as an example for reference, the relation between the gas pressure P' of the inert gas fire extinguisher on the discharge side of the vessel valve and the gas pressure P2' of the inert gas fire extinguisher in the fire extinguisher storage vessel drops as a result of discharge of the inert gas fire extinguisher, the gas pressure P2' of the inert gas fire extinguisher on the discharge side of the vessel valve also drops in proportion to it, and the discharge volume of the inert gas fire extinguisher decreases (a difference from the case of the pressure control valve is indicated with shaded part). To discharge the prescribed volume of inert gas fire extinguisher in a prescribed time t, it becomes necessary to take measures such as increasing the inside diameter of the piping or mitigating the degree of depressurization (increase the initial gas pressure P' of inert gas fire extinguisher on the discharge side of the vessel valve), etc., but this presents a problem of high equipment cost.

Next, an explanation will be given of the operation in case of fire for the inert gas fire fighting system of the first embodiment.

Now, supposing that a fire broke out in the object fire fighting section 6-1, if the person who discovered the fire operates a push button (a case of manual operation) corresponding to this object fire fighting section 6-1, an electrical signal is sent to the solenoid 12-1 for opening the starting gas vessel and the solenoid 12-1 works to open the starting gas vessel 11-1.

The starting gas discharged with the opening of the starting gas vessel 11-1 is first introduced into the selecting valve opening device 10-1 to open the selecting valve 9-1. The gas then passes through the starting gas pipeline 13-1 via the nonreturn valve 14-1, and passes through the nonreturn valve 14-A and the nonreturn valve 14-B to reach all vessel valves 2 and open all of the five fire extinguisher storage vessels 1.

At that time, the selecting valve 9-2 and the selecting valve 9-3 are not opened because the gas cannot pass through the nonreturn valve 14-2 and the nonreturn valve 14-3.

Because the vessel valve 2 is a pressure control valve which controls the gas pressure P of the inert gas fire extinguisher on the discharge side at no more than the reference gas pressure P0 determined by the gas pressure P1 of the constant-pressure gas source, the inert gas controlled at no more than the reference gas pressure P0 determined by the gas pressure P1 of the constant-pressure source, the inert gas controlled at no more than the reference gas pressure P0 (110 kgf/cm$^2$) is sent from the opened five fire extinguisher storage vessels 1 to the injection head 7-1 through vessel valve 2, connecting pipe 3, collecting pipe 4, selecting valve 9-1, main piping 5-1, and branch pipe 8-1, and then discharged from the injection head 7-1 into the object fire fighting section 6-1.

Moreover, supposing that a fire broke out in the object fire fighting section 6-2, if the person who discovered the fire operates the push button (a case of manual operation) corresponding to this object first fighting section 6-2, an electric signal is sent to the solenoid 12-2 for opening the starting gas vessel. The solenoid 12-2 works to open the starting gas vessel 11-2.

The starting gas discharged with the opening of the starting gas vessel 11-2 is first introduced into the selecting valve opening device 10-2 to open the selecting valve 9-2. It then passes through the starting gas pipeline 13-2 via the nonreturn valve 14-2 and passes through the nonreturn valve 14-B to reach the vessel valves 2 and open three of the fire extinguisher storage vessels 1, i.e., fire extinguisher storage vessels 1-3, 1-4, 1-5.

At that time, two of the fire extinguisher storage vessels 1, i.e., fire extinguisher storage vessels 1-1, 1-2, are not opened because the gas cannot pass through the nonreturn valve 14-A.

Moreover, the selective valve 9-1 and the selecting valve 9-3 are not opened because the gas cannot pass through the nonreturn valve 14-1 and the nonreturn valve 14-3.

Because the vessel valve 2 is a pressure control valve which controls the gas pressure P of the inert gas fire extinguisher on the discharge side at no more than the reference gas pressure P0 determined by the gas pressure P1 of the constant-pressure gas source, the inert gas controlled at no more than the reference gas pressure P0 (110 kgf/cm$^2$) is sent from the opened three fire extinguisher storage vessels 1-3, 1-4, 1-5 to the injection head 7-2 through vessel valve 2, connecting pipe 3, collecting pipe 4, selecting valve 9-2, main piping 5-2 and branch pipe 8-2, and then discharged from the injection head 7-2 into the object fire fighting section 6-2.

Moreover, supposing that a fire broke out in the object fire fighting section 6-3, if the person who discovered the fire operates the push button (a case of manual operation) corresponding to this object fire fighting section 6-3, an electric signal is sent to the solenoid 12-3 for opening the starting gas vessel, and the solenoid 12-3 works to open the starting gas vessel 11-3.

The starting gas discharged with the opening of the starting gas vessel 11-3 is first introduced into the selecting valve opening device 10-3 to open the selecting valve 9-3. It then passes through the starting gas pipeline 13-3 via the nonreturn valve 14-3 to reach the vessel valve 2 and open one of the fire extinguisher storage vessels 1, i.e., fire extinguishing storage vessel 1-5.

At that time, four of the fire extinguisher storage vessels 1, i.e., fire extinguisher storage vessels 1-1, 1-2, 1-3, 1-4, are not opened because the gas cannot pass through the nonreturn valve 14-B (naturally, it cannot pass through the nonreturn valve 14-A either).

Moreover, the selecting valve 9-1 and the selecting valve 9-2 are not opened because the gas cannot pass through the nonreturn valve 14-1 and the nonreturn valve 14-2.

By the way, because the vessel valve 2 is a pressure control valve which controls the gas pressure P of the inert gas fire extinguisher on the discharge side at no more than the reference gas pressure P0 determined by the gas pressure P1 of the constant-pressure gas source, the inert gas controlled at no more than the reference gas pressure P0 (110 kgf/cm$^2$) is sent from the opened fire extinguisher storage vessel 1-5 to the injection head 7-3 through vessel valve 2, connecting pipe 3, collecting pipe 4, selecting valve 9-3, main piping 5-3, and branch pipe 8-3, and then discharged from the injection head 7-3 into the object fire fighting section 6-3.

The above explanation has been given on a case where there are three object fire fighting sections and the number of fire extinguisher storage vessels 1 is five. However, the number of object fire fighting sections and the number of fire extinguisher storage vessels 1, as well as the number of fire extinguisher storage vessels 1 to be opened, are not restricted to those of the present embodiment to be indicated hereafter), but may be set optionally as required.

Figure 6:
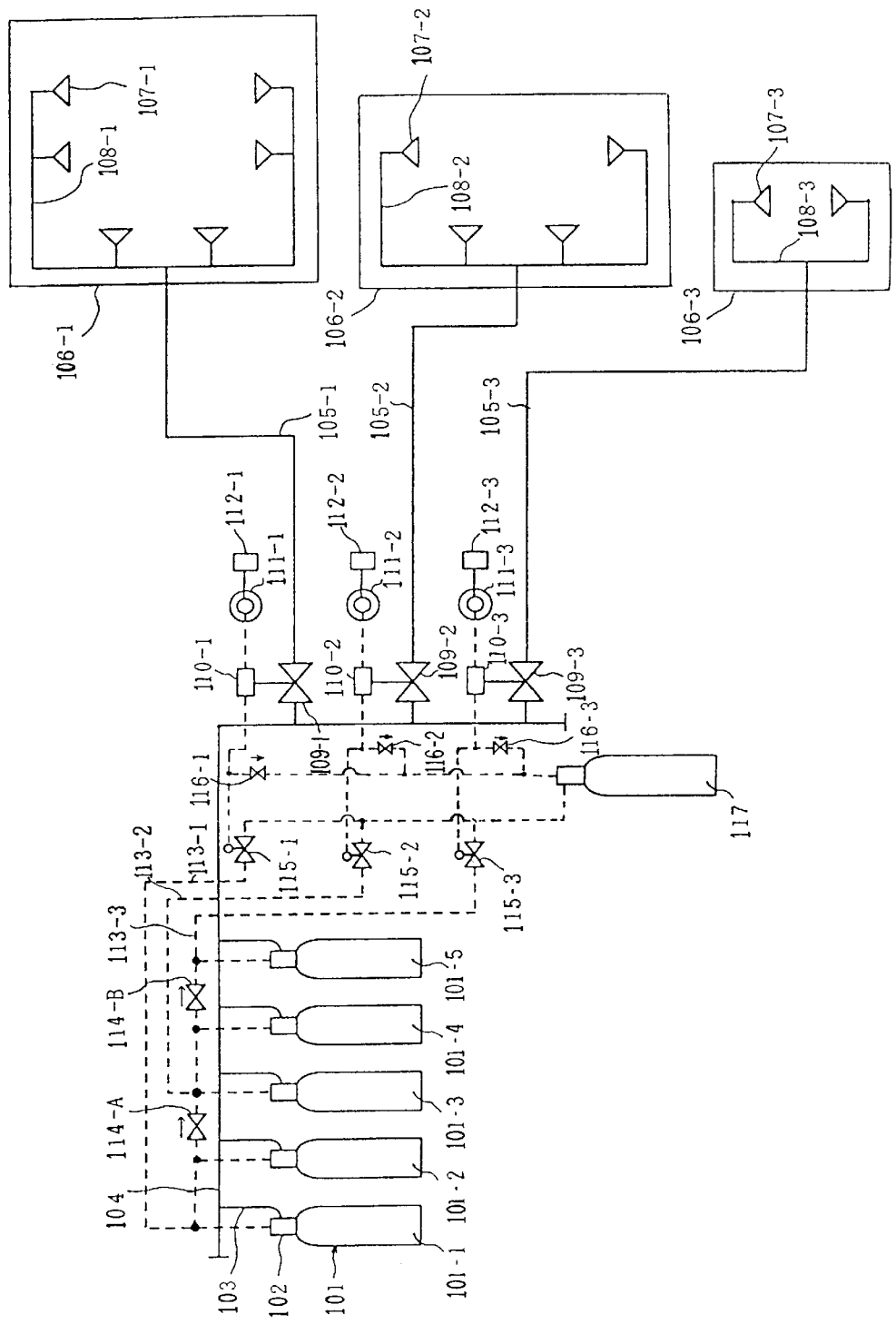
FIG. 6 is a drawing showing a second embodiment of the inert gas fire fighting system of the present invention.

FIG. 6 shows a second embodiment of the inert gas fire fighting system of the present invention. Reference numbers for components of the second embodiment similar to the first embodiment are provided with similar reference numerals, but have their numbers increased by 100. A repeated discussion of similar components may be omitted here for the sake of brevity, and reference may be had to the above discussion concerning the first embodiment for the corresponding components.

This embodiment is a variation of the first embodiment and is realized by providing, as a constant-pressure gas source, a constant-pressure gas vessel 117 filled with nitrogen gas (110 kgf/cm$^2$ at 35° C.) apart from the starting gas vessels 111-1, 111-2, 111-3.

Moreover, it is also possible to use, as a constant-pressure gas source, a gas vessel filled with high-pressure gas and provided with a pressure regulator, and to adjust the gas pressure P1 by means of this pressure regulator, or to constitute the constant-pressure gas source by a high pressure generator and an accumulator maintaining the pressure generated by the high pressure generator.

In this way, by providing a constant-pressure gas vessel 117, even if the number of the first extinguisher storage vessels 101 to be installed, i.e., the number of vessel valves (pressure control valves), increases, it becomes possible to easily change the capacity of the constant-pressure gas vessel 117 accordingly and thus maintain the prescribed reference gas pressure P0.

Furthermore, in the drawing, 115-1, 115-2, 115-3 represent piston valves disposed in the starting gas pipelines 113-1, 113-2, 113-3 in place of the nonreturn valves 14-1, 14-2, 14-3 of the first embodiment. 116-1, 116-2, 116-3 are nonreturn valves provided at proper places between the starting gas vessels 111-1, 111-2, and 111-3 and the constant-pressure gas vessel 117. The passable direction of the nonreturn valves 116-1, 116-2, 116-3 is indicated with the direction of the arrow marks in the drawing.

The numbers 1, 2, 3 at the end of the above-described members correspond to the suffixes 1, 2, 3 of the object fire fighting sections, respectively.

Next, explanation will be given on the operation in case of fire of the inert gas fire fighting system of the second embodiment.

Now, supposing that a fire broke out in the object fire fighting section 106-1, if the person who discovered the fire operates the push button (a case of manual operation) corresponding to this object fire fighting section 106-1, an electric signal is sent to the solenoid 112-1 for opening the starting gas vessel and the solenoid 112-1 works to open the starting gas vessel 111-1.

The starting gas discharged with the opening of the starting gas vessel 111-1 is first introduced into the selecting valve opening device 110-1 to open the selecting valve 109-1, and then passes through the nonreturn valve 116-1 to open the constant-pressure gas vessel 117 and the piston valve 115-1.

As a result, the constant-pressure gas of the constant-pressure gas vessel 117 passes through the starting gas (constant-pressure gas) pipeline 113-1 via the piston valve 115-1, passes through the nonreturn valve 114-A, and the nonreturn valve 114-B and reaches all of the vessel valves 102 and open all of the five fire extinguisher storage vessels 101.

At that time, the selecting valves 109-2, 109-3 and the piston valves 115-2, 115-3 are not opened, because the gas cannot pass through the nonreturn valve 116-2 and the nonreturn valve 116-3.

By the way, because the vessel valve 102 is a pressure control valve which controls the gas pressure P of the inert gas fire extinguisher on the discharge side to no more than the reference gas pressure P0 determined by the gas pressure P1 of the constant-pressure gas source, the inert gas controlled at no more than the reference gas pressure P0 (110 kgf/cm$^2$) is sent from the opened five fire extinguisher storage vessels 101 to the injection head 107-1 through vessel valve 102, connecting pipe 103, collecting pipe 104, selecting valve 109-1, main piping 105-1, and branch pipe 108-1, and is then discharged from the injection 107-1 into the object fire fighting section 106-1.

Moreover, supposing that a fire broke out in the object fire fighting section 106-2, if the person who discovered the fire operates the push button (a case of manual operation) corresponding to this object fire fighting section 106-2, an electric signal is sent to the solenoid 112-2 for opening the starting gas vessel and the solenoid 112-2 works to open the starting gas vessel 111-2.

The starting gas discharged with the opening of the starting gas vessel 111-2 is first introduced into the selecting valve opening 110-2 to open the selecting valve 109-2, and then passes through the nonreturn valve 116-2, and then passes through the nonreturn valve 116-2 to open the constant gas vessel 117 and the piston 115-2.

As a result, the constant-pressure gas of the constant-pressure gas vessel 117 passes through the starting gas (constant-pressure gas) pipeline 113-2 via the piston valve 115-2, passes through the nonreturn valve 114-B, and reaches the vessel valves 102 and opens three of the fire extinguisher storage vessels 101, i.e., fire extinguisher storage vessels 101-3, 101-4, 101-5.

At that time, two of the fire extinguisher storage vessels 101, i.e., fire extinguisher storage vessels 101-1, 101-2, are not opened because the gas cannot pass through the nonreturn valve 114-A.

Moreover, the selecting valve 109-1, the selecting valve 109-3, and the piston valve 115-1 and piston valve 115-3 are not opened because the gas cannot pass through the nonreturn valve 116-1 and the nonreturn valve 116-3.

By the way, because the vessel valve 102 is a pressure control valve which controls the gas pressure P of the inert gas fire extinguisher on the discharge side to no more than the reference gas pressure P0 determined by the gas pressure P1 of the constant-pressure gas source, the inert gas controlled at no more than the reference gas pressured P0 (110 kgf/cm$^2$) is sent from the opened three fire extinguisher storage vessels 101-3, 101-4, 101-5 to the injection head 107-2 through vessel valve 102, connecting pipe 103, collecting pipe 104, selecting valve 109-2, main piping 105-2, and branch pipe 108-2, and is then discharged from the injection head 107-2 into the object fire fighting section 106-2.

Furthermore, supposing that a fire broke out in the object fire fighting section 106-3, if the person who discovered the fire operates the push button (a case of manual operation) corresponding to this object fire fighting section 106-3, an electric signal is sent to the solenoid 112-3 for opening the starting gas vessel and the solenoid 112-3 works to open the starting gas vessel 111-3.

The starting gas discharged with the opening of the starting gas vessel 111-3 is first introduced into the selecting valve opening device 110-3 to open the selecting valve 109-3, and then passes through the nonreturn valve 116-3 to open the constant-pressure gas vessel 117 and the piston valve 115-3.

As a result, the constant-pressure gas of the constant-pressure gas vessel 117 passes through the starting gas (constant pressure gas) pipeline 113-3 via the piston valve 115-3, reaches the vessel valves 102, and opens one of the fire extinguisher storage vessels 101, i.e., fire extinguisher storage vessel 101-5.

At that time, four of the fire extinguisher storage vessels 101, i.e., fire extinguisher storage vessels 101-1, 101-2 101-3, 101-4, are not opened because the gas cannot pass through the nonreturn valves 114-B.

Moreover, the selecting valves 109-1, 109-2 and the piston valves 115-1, 115-2 are not opened because the gas cannot pass through the nonreturn valve 116-1 and the nonreturn valve 116-2.

By the way, because the vessel valve 102 is a pressure control valve which controls the gas pressure P of the inert gas fire extinguisher on the discharge side to no more than the reference gas pressure P0 determined by the gas pressure P1 of the constant-pressure gas source, the inert gas controlled to no more than the reference gas pressure P0 (110 kgf/cm$^2$) is sent from the opened fire extinguisher storage vessel 101-5 to the injection 107-3 through vessel valve 102, connecting pipe 103, collecting pipe 104, selecting valve 109-3, main piping 105-3, and branch pipe 108-3, and then discharged from the injection head 107-3 into the object fire fighting section 106-3.

Figure 7:
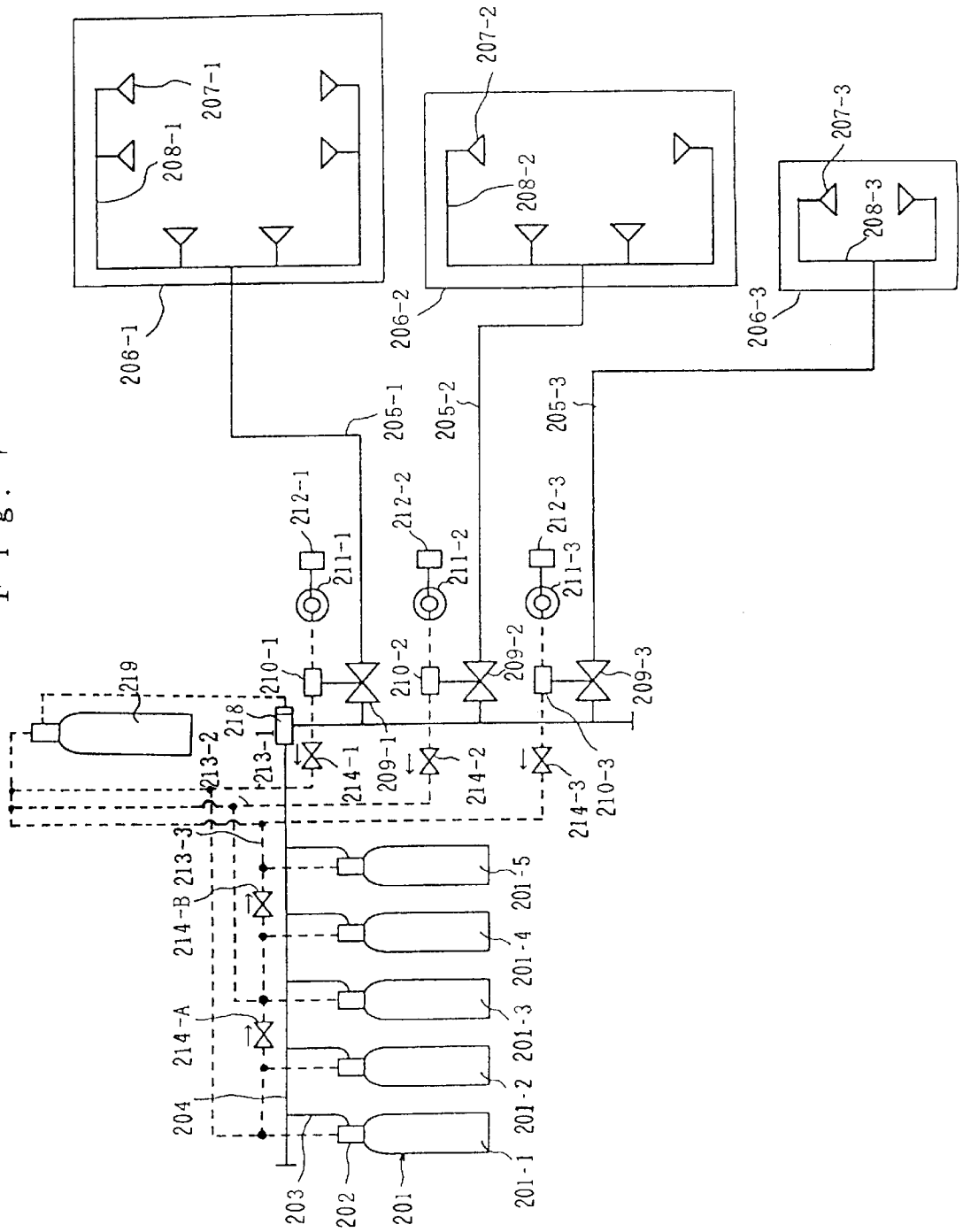
FIG. 7 is a drawing showing a third embodiment of the inert gas fire fighting system of the present invention.

FIG. 7 shows a third embodiment of the inert gas fire fighting system of the present invention. Reference numbers for components of the third embodiment similar to the first embodiment are provided with similar reference numerals, but have their numbers increased by 200. A repeated discussion of similar components may be omitted here for the sake of brevity, and reference may be had to the above discussion concerning the first embodiment for the corresponding components.

This embodiment is a variation of the first embodiment and is realized by providing, at a proper point on the collecting pipe 204 connecting between the fire extinguisher storage vessels 201 and the selecting valves 209-1, 209-1, 209-3, a pressure control valve 18 for controlling the gas pressure P of the inert gas fire extinguisher on the discharge side to no more than the reference gas pressure P0 determined by the gas pressure P1 of the constant-pressure gas source. As a constant-pressure gas source is provided a constant-pressure gas vessel 219 filled with nitrogen gas (110 kgf/cm$^2$ at 35° C.) apart from the starting gas vessels 211-1, 211-2, 211-3.

Moreover, it is also possible to make up the system in a way to utilize the starting gas vessels 211-1, 211-2, 211-3 as in the first embodiment, or to use as a constant-pressure gas source a gas vessel filled with high-pressure gas and provided with a pressure regulator to adjust the gas pressure P1 by means of this pressure regulator, or to constitute the constant-pressure gas source by a high pressure generator and an accumulator maintaining the pressure generated by the high pressure generator.

In this way, by providing a pressure control valve 18 on the collecting pipe 204, it becomes possible to use ordinary vessel valve for the vessel valve 202, and thus reduce the equipment costs. The primary side equipment units of the fire fighting system, such as vessel valve 202, connecting pipe 203, collecting pipe 204, etc., between the fire extinguisher storage vessels to the pressure control valve 18 are subject to the high gas pressure of the inert gas fire extinguisher. For that reason, those primary side equipment units must be constructed in a way to resist this high pressure. However, the collecting pipe 204, etc. have a high pressure resistance because of a smaller inside diameter as compared with the main pipings 205-1, 205-2, 205-3, and there is thus no need of increasing the pressure resistance grade of the primary side equipment units of the fire fighting system. This makes it possible to not only reduce the equipment costs, but also to even apply the system to existing facilities as it is.

The members 1, 2, 3 at the end of those members correspond to the numbers 1, 2, 3 at the end of those members correspond to the members 1, 2, 3 suffixed to the object fire fighting sections respectively.

Figure 8:
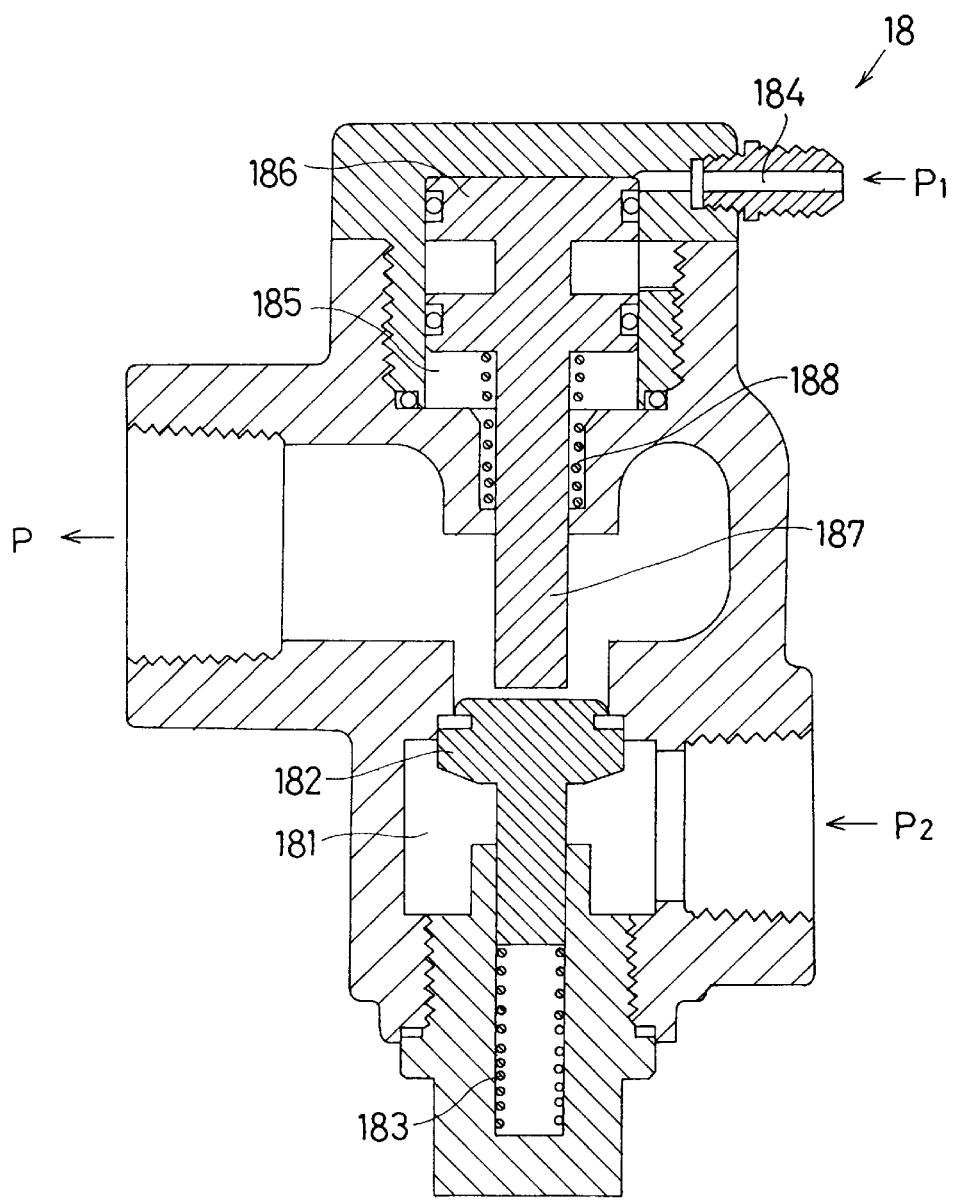
FIG. 8 is a drawing showing a fourth embodiment of the inert gas fire fighting system of the present invention.
Figure 9:
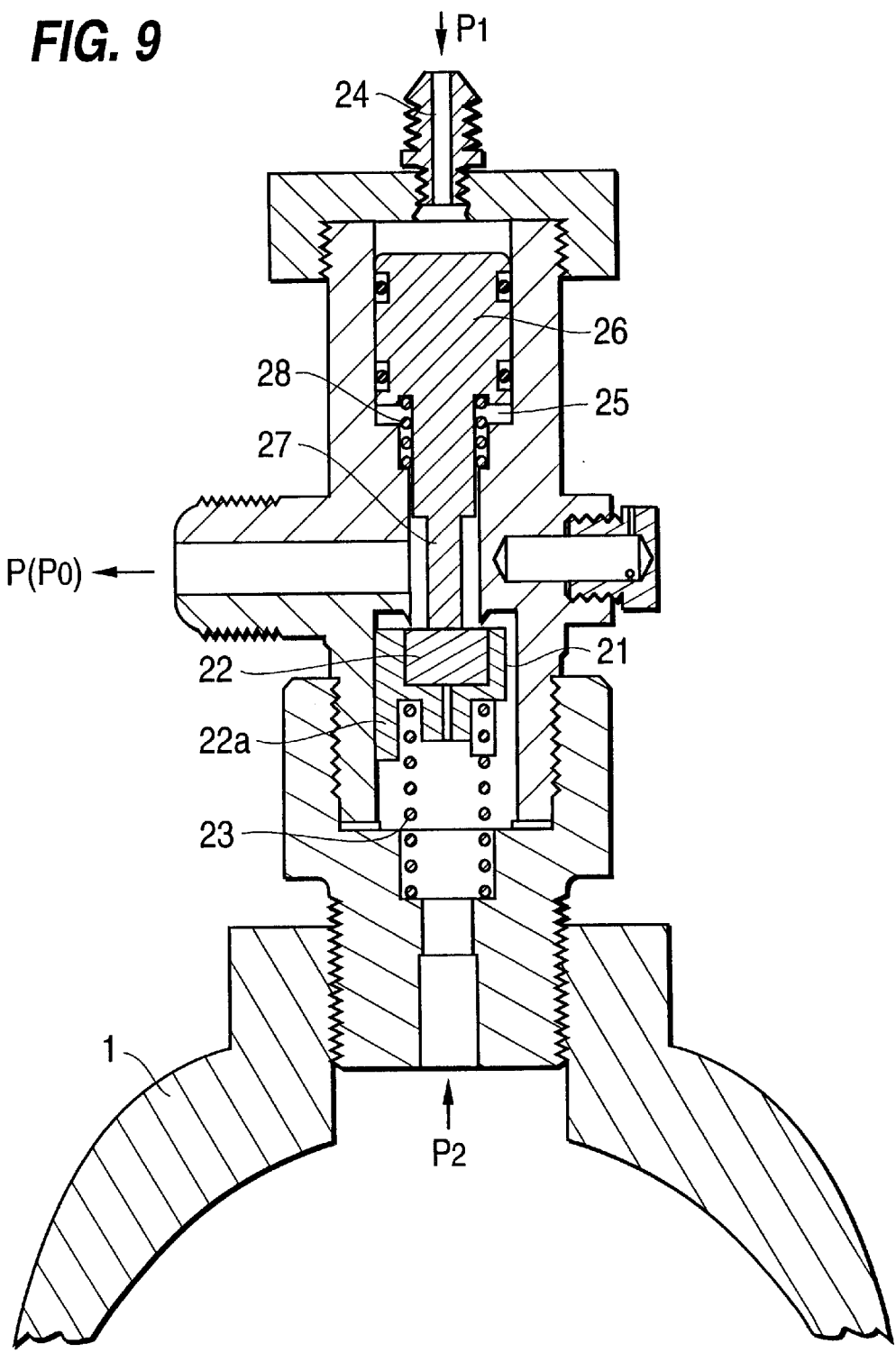
FIG. 9 is a drawing showing the first embodiment of the pressure control valve for the inert gas fire fighting system of the present invention, demonstrating the open position of the valve.

The pressure control valve 18, which basically has the same construction and same actions as the pressure control valve used for the vessel valve 2 of the first embodiment, is composed, as shown in FIG. 8, of a flow channel valve 182 provided in a flow channel 181 for inert gas fire extinguisher. A spring 183 urges the flow channel valve 182 provided in a flow channel 181 for inert gas fire extinguisher. A spring 183 urges the flow channel valve 182 in the direction closing the flow channel 181. A gas feed port 184 connects with the constant-pressure gas vessel 219, and a piston 186 provided in cylinder 185 is connected at one end of the gas feed port 184 and the other end to the discharge side of the flow channel 181. An operating bar 187 is formed at the end of the piston 186 for operating the flow channel valve 182 in the direction opinion the flow channel 181. A spring 188 urges the piston 186 in the direction opposite to that of the flow channel valve 182.

Next, explanation will be given of the operation in case of fire for the inert gas fire fighting system of the third embodiment.

Now, supposing that a fire broke out in the object fire fighting section 206-1, if the person who discovered the fire operates the push button (a case of manual operation) corresponding to this object fire fighting section 206-1, an electric signal is sent to the solenoid 212-1 for opening the starting gas vessel and the solenoid 212-1 works to open the starting gas vessel 211-1.

The starting gas discharged with the opening of the starting gas vessel 211-1 is first introduced into the selecting valve opening device 210-1 to open the selecting valve 209-1, passes through the nonreturn valve 214-1 to open the constant-pressure gas vessel 219, and passes through the nonreturn valves 214-A, 214-B to reach all vessel valves 202 and open all of the five fire extinguisher storage vessels 201.

At that time, the selecting valve 209-2 and the selecting valve 209-3 are not opened because the gas cannot pass through the nonreturn valve 214-2 and the nonreturn valve 214-3.

By the way, because the pressure control valve 18 which controls the gas pressure P of the inert gas fire extinguisher on the discharge side to no more than the reference gas pressure P0 determined by the gas pressure P1 of the constant-pressure gas source is provided on the collecting pipe 204, the inert gas discharged from the opened five fire extinguisher storage vessels 201, and sent to the collecting paper 204 through vessel valve 202 and connecting pipe 203, is controlled to no more than the reference gas pressure P0 (110 kgf/cm$^2$) by the pressure control valve 18, sent to the injection head 207-1 through selecting valve 209-1, main piping 205-1, and branch pipe 208-1, and then discharged from the injection head 207-1 into the object fire fighting section 206-1.

Moreover, supposing that a fire broke out in the object fire fighting section 206-2, if the person who discovered the fire operates the push button (a case of manual operation) corresponding to this object fire fighting section 206-1, an electric signal is sent to the solenoid 212-2 for opening the starting gas vessel and the solenoid 212-2 works to open the starting gas vessel 211-2.

The starting gas discharged with the opening of the starting gas vessel 211-2 is first introduced into the selecting valve opening device 210-2 to open the selecting valve 209-2, passes through the nonreturn valve 214-2 to open the constant-pressure gas vessel 219, and passes through the nonreturn valves 214-B to reach the vessel valves 202 and open three of the fire extinguisher storage vessels 201, i.e., fire extinguisher storage vessels 201-3, 201-4, 201-5.

At that time, two of the fire extinguisher storage vessels 201, i.e., first extinguisher storage vessels 201-1, 201-2, are not opened because the gas cannot pass through the nonreturn valve 214-A.

Moreover, the selecting valve 209-1 and the selecting valve 209-3 are not opened because the gas cannot pass through the nonreturn valve 214-1 and the nonreturn valve 214-3.

Because the pressure control valve 18 which controls the gas pressure P of the inert gas fire extinguisher on the discharge side to no more than the reference gas pressure P0 determined by the gas pressure P1 of the constant-pressure P0 determined by the gas pressure P1 of the constant-pressure gas source is provided on the collecting pipe 204, the inert gas discharged from the opened three fire extinguisher storage vessels 201-3, 201-4, 201-5 and sent to the collecting pipe 204 through vessel valve 202 and connecting pipe 203 is controlled to no more than the reference gas P0 (110 kgflcm$^2$) by the pressure control valve 18, sent to the injection head 207-2 through selecting valve 209-2, main piping 205-2, and branch pipe 208-2, and then discharged from the injection head 201-2 into the object fire fighting section 206-2.

Moreover, supposing that a fire broke out in the object fire fighting section 206-3, if the person who discovered the fire operates the push button (case of manual operation) corresponding to this object fire fighting section 206-3, an electric signal is sent to the solenoid 212-3 for opening the starting gas vessel and the solenoid 212-3 works to open the starting gas vessel 211-3.

The starting gas discharged with the opening of the starting gas vessel 211-3 is first introduced into the selecting valve opening device 210-3 to open the selecting valve 209-3, passes through the nonreturn valve 214-3 to open the constant-pressure gas vessel 219, and passes through the nonreturn valves 214-3 to reach the vessel valves 202 and open one of the fire extinguisher storage vessels 201, i.e., fire extinguisher storage vessel 200-5.

At that time, four of the fire extinguisher storage vessels 201, i.e., fire extinguisher storage vessels 201-1, 201-2, 201-3, 201-4, are not opened, because the gas cannot pass through the nonreturn valve 214-B (naturally, it cannot pass through the nonreturn valve 214-A either).

Moreover, the selecting valve 209-1 and the selecting valve 209-2 are not opened because the gas cannot pass through the nonreturn valve 214-1 and the nonreturn valve 214-2.

Because the pressure control valve 18 which controls the gas pressure P of the inert gas fire extinguisher on the discharge side to no more than the reference gas pressure P0 determined by the gas pressure P1 of the constant-pressure gas source is provided on the collecting pipe 204, the inert gas discharged from the opened one fire extinguisher storage vessel 201-5 and sent to the collecting pipe 204 through vessel valve 201-5 and sent to the collecting pipe 204 through vessel valve 202 and connecting pipe 203 is controlled to no more than the reference gas pressure P0 (110 kgf/cm$^2$) by the pressure control valve 18, sent to the injection head 207-3 through selecting valve 209-3, main piping 205-3, and branch pipe 208-3, and then discharged from the injection head 207-3 into the object fire fighting section 206-3.

We claim:

1. A pressure control valve for an inert gas fire fighting system that includes an inert gas fire extinguisher having a flow channel, and the flow channel having a discharge side, said pressure control valve comprising:

a flow channel valve provided in the flow channel of the inert gas fire extinguisher movable between a closed position in which the flow channel is closed and an open position;

a spring urging said flow channel valve toward said closed position;

a gas feed port for connection to a constant-pressure source gas;

a piston provided in a cylinder having one end fluidly connected with said gas feed port and another end fluidly connected with the discharge side of the flow channel of the inert gas fire extinguisher; and an operating bar at one end of said piston for operating said flow channel valve by moving said flow channel valve to said open position;

wherein said piston has one working surface at one side thereof exposed to the constant-pressure source gas such that said constant-pressure source gas defines a reference gas pressure and another working surface at another side thereof exposed to the discharge side of the flow channel for exposure to high pressure gas of the inert gas fire extinguisher when said flow channel valve is in said open position, whereby an equilibrium can be maintained between said flow channel valve, said piston, and said operating bar to thereby control gas pressure of the inert gas fire extinguisher at the discharge side to a pressure no higher than the reference gas pressure defined by the constant-pressure source gas.

2. The pressure control valve of claim 1, wherein said flow channel valve comprises a plurality of guide members for guiding said flow channel valve in the flow channel.

3. The pressure control valve of claim 1, wherein said piston is movable between a first position in which said operating bar is disengaged with said flow channel valve such that said flow channel valve is in said closed position, and a second position in which said operating bar is engaged with said flow channel valve such that said flow channel valve is in said open position.

4. A pressure control valve arrangement for an inert gas fire fighting system, said pressure control valve arrangement comprising:

an inert gas fire extinguisher having a flow channel, said flow channel having a discharge side;

a flow channel valve provided in said flow channel of the inert gas fire extinguisher movable between a closed position in which said flow channel is closed and an open position;

a spring urging said flow channel valve toward said closed position;

a gas feed port connected to a constant-pressure source gas;

a piston provided in a cylinder having one end fluidly connected with said gas feed port and another end fluidly connected with said discharge side of said flow channel of said inert gas fire extinguisher; and an operating bar at one end of said piston for operating said flow channel valve by moving said flow channel valve to said open position;

wherein said piston has one working surface at one side thereof exposed to said constant-pressure source gas such that said constant-pressure source gas defines a reference gas pressure and another working surface at another side thereof exposed to said discharge side of said flow channel for exposure to high pressure gas of said inert gas fire extinguisher when said flow channel valve is in said open position, whereby an equilibrium can be maintained between said flow channel valve, said piston, and said operating bar to thereby control gas pressure of said inert gas fire extinguisher at said discharge side to a pressure no higher than the reference gas pressure defined by said constant-pressure source gas.

5. The pressure control valve arrangement of claim 4, wherein said flow channel valve comprises a plurality of guide members for guiding said flow channel valve in the flow channel.

6. The pressure control valve arrangement of claim 4, wherein said piston is movable between a first position in which said operating bar is disengaged with said flow channel valve such that said flow channel valve is in said closed position, and a second position in which said operating bar is engaged with said flow channel valve such that said flow channel valve is in said open position.

7. A pressure control valve, for an inert gas fire fighting system that includes an inert gas fire extinguisher having a flow channel, and the flow channel having a discharge side, said pressure control valve comprising:

a flow channel valve provided in the flow channel of the inert gas fire extinguisher movable between a closed position in which the flow channel is closed and an open position;

a spring urging said flow channel valve toward said closed position;

a gas feed port for connection to a constant-pressure source gas;

a piston provided in a cylinder having one end fluidly connected with said gas feed port and another end fluidly connected with the discharge side of the flow channel of the inert gas fire extinguisher; and an operating bar at one end of said piston for operating said flow channel valve by moving said flow channel valve to said open position;

wherein said piston has one working surface at one side thereof exposed to the constant-pressure source gas such that said constant-pressure source gas defines a reference gas pressure and another working surface at another side thereof exposed to the discharge side of the flow channel for exposure to high pressure gas of the inert gas fire extinguisher when said flow channel valve is in said open position, wherein said flow channel valve, said spring, said piston, and said operating bar together define a means for controlling gas pressure of the inert gas fire extinguisher at the discharge side to a pressure no higher than the reference gas pressure defined by the constant-pressure source gas.

8. The pressure control valve of claim 7, wherein said flow channel valve comprises a plurality of guide members for guiding said flow channel valve in the flow channel.

9. The pressure control valve of claim 7, wherein said piston is movable between a first position in which said operating bar is disengaged with said flow channel valve such that said flow channel valve is in said closed position, and a second position in which said operating bar is engaged with said flow channel valve such that said flow channel valve is in said open position.

* * * * *